United States Patent Office 3,178,452
Patented Apr. 13, 1965

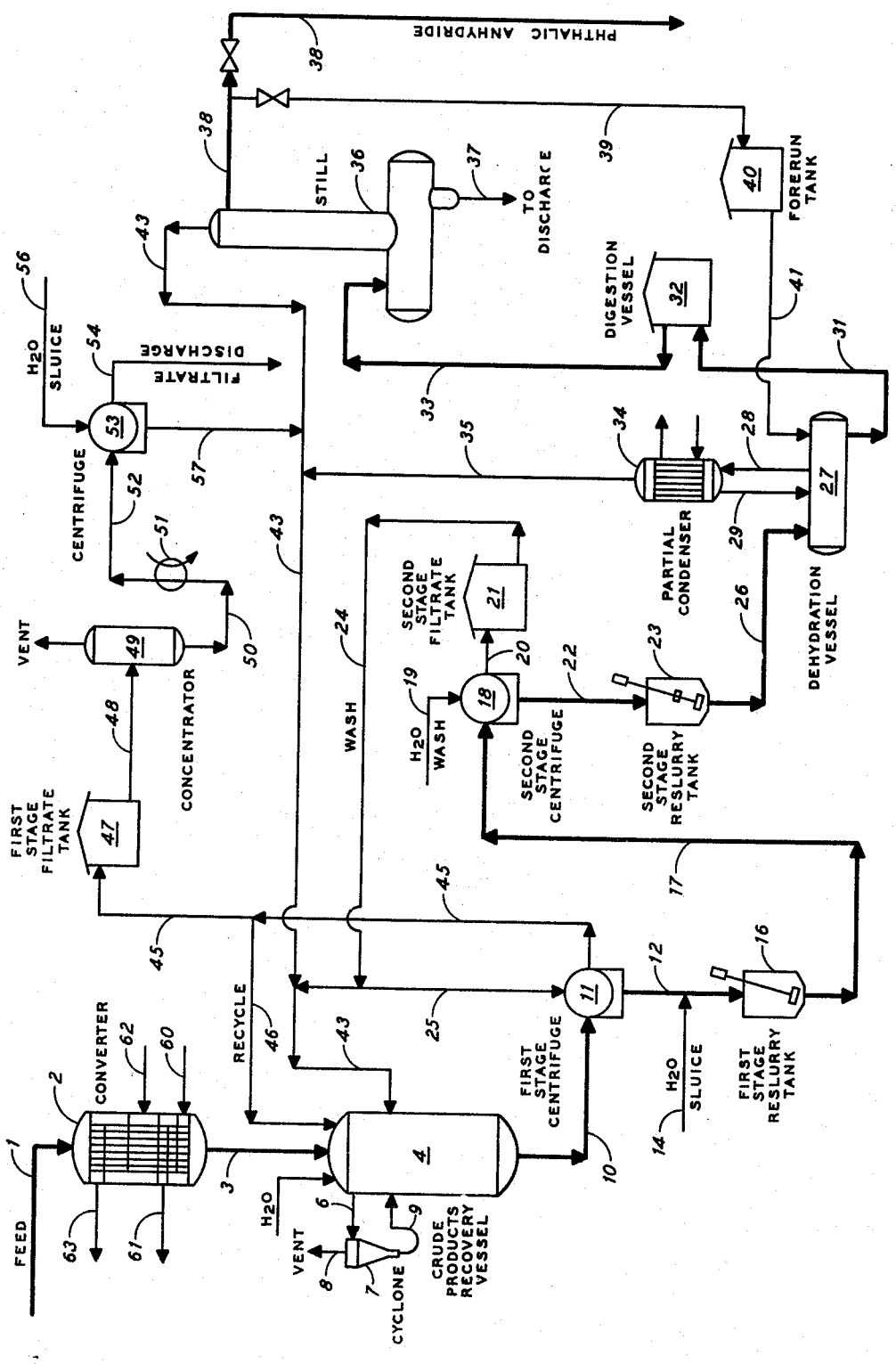

3,178,452
PROCESS FOR PRODUCING PHTHALIC ANHYDRIDE FROM ORTHOXYLENE
Calvin S. Smith, El Cerrito, and Mack F. Hughes, Albany, Calif., assignors to California Research Corporation, San Francisco, Calif., a corporation of Delaware
Filed Feb. 5, 1962, Ser. No. 171,180
3 Claims. (Cl. 260—346.4)

This invention relates to an improved process for the production of phthalic anhydride from orthoxylene. More particularly, it relates to a vapor phase process for the vanadium oxide catalyzed partial oxidation of orthoxylene employing a dual temperature zone converter. Still more particularly, it relates to an integrated process for the production and purification of phthalic anhydride.

It is known to produce phthalic anhydride by the vapor phase catalyzed partial oxidation of orthoxylene using a single temperature zone converter. However, such converters suffer serious deficiencies in that they provide inadequate control of the reaction zone within the catalyst bed, and are known to experience "hot spot" migrations giving rise to substantially increased operational hazards requiring costly safety precautions as well as resulting in appreciable yield losses.

We have now found that orthoxylene may be converted to phthalic anhydride by the vapor phase partial oxidation of orthoxylene in a process substantially free of operational hazards, wherein catalyst hot spot migrations are positively contained and risks due to fire and explosion from this source are eliminated, and, surprisingly, substantial yield improvements are experienced in a process which comprises continuously introducing a vaporized feed of orthoxylene and molecular oxygen into contact with a fixed bed solid vanadium oxide catalyst in indirect heat exchange with two successive heat exchangers. In this process, the primary reaction zone exchanger is maintained at a temperature of about 850–1100° F. and the secondary thermal stabilization or recovery zone exchanger at a temperature of about 400–800° F. The resulting reaction product mixture comprising phthalic anhydride is thereafter processed to recover purified phthalic anhydride.

We have also found that phthalic anhydride may be produced at greatly improved rates and yields by the partial oxidation of orthoxylene in the vapor phase at reaction zone temperatures above about 1100° F. by contacting orthoxylene in admixture with molecular oxygen with a solid vanadium oxide catalyst in a reaction zone at about 1100–1500° F. for a period of from 0.001 to 0.05 second by employing the dual temperature zone converter wherein the primary reaction zone exchanger is a circulating molten salt bath, surrounds the reaction zone, and is maintained at about 950–1100° F., and the secondary thermal stabilization zone exchanger is maintained at about 400–800° F. by a separate circulating molten salt bath. Surprisingly, when the oxidation is conducted in the foregoing manner, the expected decrease in phthalic anhydride-maleic anhydride reaction product selectivity ratio is not experienced and improved phthalic anhydride yields are obtained. Moreover, although reaction zone temperatures as high as 1300°, 1400°, and even 1500° F. may be employed, catalyst hot spot migrations are positively contained, and risks due to the fire and explosion hazards incident to high temperature vapor phase reaction systems are eliminated.

The present process contemplates the use of a fixed bed reactor charged with a xylene vapor phase oxidation catalyst, preferably vanadium oxide, and particularly a supported vanadium oxide. Vaporized orthoxylene and a molecular oxygen-containing gas, preferably air, are introduced separately or in admixture into the catalyst bed, and the gaseous mixture in passing through the bed experiences in the reaction zone a marked temperature increase and one which, depending upon the surrounding bath temperature, may be as much as 100–400° F. and even higher.

By reaction zone in the present process is meant the catalyst volume in the bed in which the local temperature substantially exceeds the immediately preceding bed temperature and the downstream bed temperature. Thus, the reaction zone is a zone of high temperature variation and, as contemplated in the preferred form of the present invention, is the fixed bed catalyst volume in which reaction temperatures exceed about 1100° F. Reaction or residence times indicated for the process refer to the period of transit of the product generating feed stream through the reaction zone.

Broadly, reaction zone temperatures of the order of 1000° F. to 1500° F. and even 1600° F. and higher may be used. Reaction zone temperatures in the range 1100°–1500° F. are particularly desirable. Still more desirable are reaction zone temperatures in the range 1200°–1400° F. Relatively longer reaction zone residence times are desirably used at the lower temperatures and, correspondingly, relatively shorter reaction zone residence times are desirably used at the higher reaction zone temperatures. Thus, at a reaction zone temperature in the range 1000°–1150° F. residence times of the order of 0.50–0.02 second are desirable, and with increase in temperature, for example, in the range about 1200°–1300° F., shorter times may be desirably used, i.e., from about .01 to about 0.005 second. In the upper operational temperature zone, for example, above about 1300° F., shorter residence times are desirable and may even be as short as .001 second. For a given reaction temperature range, residence times appreciably longer than the indicated desirable period cause serious product losses through over-oxidation, and residence times appreciably shorter than those indicated as being desirable cause conversions to be incomplete, thereby complicating subsequent processing.

Pursuant to the invention, the catalyst bed is surrounded by two heat exchangers in juxtaposition. The temperature of the primary reaction zone exchanger determines the reaction zone temperature, i.e., a primary temperature of about 850°–950° F. results in a reaction zone temperature of from about 1000°–1100° F., and for an exchanger temperature of from about 950°–1100° F. the corresponding reaction zone temperatures vary from about 1100°–1500° F. Desirably, the reaction zone is positioned in the catalyst bed immediately preceding the recovery zone. A particularly satisfactory means of determining the reaction zone location is by use of catalyst bed temperature profiles as indicated by a series of fixed thermocouples or by one or more movable thermocouples conveniently located in the reactor. Thus, after a start-up of the process and location of the reaction zone, adjustment of the primary bath temperature and minor adjustments in feed flow rates and feed composition may be made to position the reaction zone and to bring reaction zone residence times within the desired period. An increase in the primary exchanger temperature causes the location of the reaction zone to be relatively further from the recovery zone.

The upper temperature limit of the secondary exchanger surrounding the recovery zone is determined by the reaction zone temperature, and should be such that for reaction zone temperature of about 1100° F. the reaction product mixture temperature is reduced to a point below about 900° F. but greater than 400° F. at a cooling rate of about $6.0 \times 10^3$ ° F. per second or higher as it leaves the reaction zone and enters the recovery zone. Slower cooling rates are ineffective insofar as causing any improvement in reaction product selectivities and phthalic anhydride yields. Faster cooling rates are desirable as reaction zone temperatures are increased, and, thus, at about a 1500° F. reaction zone temperature, a cooling rate of about $1.0 \times 10^4$ ° F. per second is desirable.

EXAMPLE 1

In a 3'×0.9" diameter vertical laboratory converter charged with a vapor phase oxidation catalyst (by weight, approximately 15% vanadium oxide on silicon carbide) orthoxylene was converted to phthalic anhydride. The converter was fitted with a means to maintain a primary exchanger temperature zone in the upper 20 inches of the catalyst bed and a means to maintain a second temperature zone in the lower recovery zone portion of the converter. The feed was introduced into the top of the reactor and the reaction product mixture was withdrawn from the bottom.

The converter was operated: (I) in the conventional manner with a single primary exchanger temperature zone, and (II) in the manner of the inventive process with there being maintained a secondary recovery temperature zone as follows:

*Run conditions*

Primary temperature zone, ° F. _____ 940
Secondary temperature zone, ° F. _____ 800
Reaction zone, ° F. _____ 1100–1175
Air to orthoxylene weight ratio _____ 20/1
Reaction zone residence time, sec. _____ 0.01
Time on stream, hrs. _____ 96

*Results*

| | I | II |
|---|---|---|
| Yield, Weight percent on Orthoxylene Fed: | | |
| Crude Phthalic Anhydride | 86 | 98 |
| By-Product (as Maleic Anhydride) | 11 | 11 |
| Product Selectivity Ratio | 7.8 | 8.9 |

Under Condition I, without employing a secondary temperature zone, the average cooling rate in the bottom part of the reactor was about $5.0 \times 10^3$ ° F. per second. Under Condition II, the average rate was about $6.0 \times 10^3$ ° F. per second.

The above data lead directly to indicate and expected yields of crude phthalic anhydride under commercial plant production conditions in the range of 100–115 weight percent with the corresponding product selectivity ratios of from about 9.6 to 10.5.

The invention may be better understood by reference to the appended drawing, of which the figure is a diagrammatical illustration of apparatus and process flow suitable for its practice.

Referring now to the drawing, a mixture of vaporized orthoxylene, preferably 95% or higher purity, and air, preheated to a temperature of about 300° F., is passed through line 1 into converter 2, where it is contacted with a vanadium oxide catalyst at a generated reaction zone temperature of about 1150°–1250° F. In leaving the reaction zone and in passing through the recovery zone of the converter, the resulting reaction product stream is reduced to a temperature below about 900° F. and is withdrawn from converter 2 at about 650° F. through line 3 and is passed into recovery vessel 4, wherein it is contacted with a substantial amount of water at about 155° F. The water cools the oxidation reaction product, causing condensation of phthalic anhydride and forming an aqueous slurry of phthalic acid in the bottom of the recovery vessel. The uncondensed portion of the oxidation reaction product is withdrawn from vessel 4 through line 6 and passed into cyclone 7, wherein entrained solids and liquids are wet contacted and the material so recovered returned to vessel 4 via line 9 and the fixed gases vented through line 8. About a 10% slurry of phthalic acid in water is withdrawn from vessel 4 through line 10 and passed into first stage centrifuge 11. Centrifuge 11 is a centrifugal filter which separates solid phthalic acid as a filter cake. The filtrate from centrifuge 11 containing substantial amounts of by-product is withdrawn from centrifuge 11 through line 45 and passed into first-stage filtrate tank 47 or recycled via line 46 to vessel 4. Wash water consisting of second stage filtrate is passed into centrifuge 11 through line 25, and upon withdrawal from centrifuge 11 passed through line 45 into first-stage filter tank 47 or recycled to vessel 4 through recycle line 46. The crude phthalic acid filter cake is sluiced from centrifuge 11 using second-stage filtrate, with process water being added via line 14 and passed through line 12 into first-stage reslurry tank 16. After mixing in tank 16, the reslurry mixture containing about 15 percent solids is pumped from reslurry tank 16 through line 17 into second-stage centrifuge 18, and the separated second-stage filtrate is passed through line 20 into second-stage filtrate tank 21 and recycled.

The second-stage phthalic acid filter cake is washed in centrifuge 18, using fresh water passed into centrifuge 18 through line 19, and the washings withdrawn from centrifuge 18 through line 20 into tank 21. The second-stage filter cake is sluiced from centrifuge 18 using fresh water from line 19, and is passed through line 22 into second-stage reslurry tank 23. After mixing, the second-stage reslurry containing about 50 weight percent solids is passed from tank 23 through line 26 into dehydration vessel 27. The temperature in the dehydration vessel is maintained in the range from 400°–475° F., preferably in the range from 425°–450° F. Steam and phthalic anhydride vapors are withdrawn from vessel 27 through line 28 and passed into partial condenser 34. In partial condenser 34 the vapors entering through line 28 are cooled to about 330° F. to cause condensation of liquid phthalic anhydride which is returned to dehydration vessel 27 through line 29. The uncondensed vapors in condenser 34 are passed through line 35 and recycled back to recovery vessel 4. Liquid phthalic anhydride accummulates in the lower portion of dehydration vessel 27 and is withdrawn through line 31 and passed into high temperature digestion tank 32. The crude molten phthalic anhydride from vessel 32 is passed into line 33 into batch product still 36, and approximately 4 percent of the charge to still 36 is removed through lines 38 and 39 as a heads cut and passed into fore-run tank 40. After removal of the heads cut, approximately 94 percent of the still charge is removed through line 38 as a specification heart cut of phthalic anhydride. Approximately 2 percent of the still charge is withdrawn through line 37 as a bottoms fraction.

The new dual temperature zone orthoxylene converter makes possible substantial increases in crude and finished phthalic anhydride product yields, which may be as much as 10–25 weight percent based on orthoxylene fed. At the same time, production rates per unit of converter reactor volume are substantially increased because of the higher reaction temperatures possible. When the reaction zone temperature is in the 1150°–1250° F. range, the production rate may be as much as 100 percent greater and even more than formerly possible. In the use of the new converter in conjunction with several process improvements, there is possible an integrated phthalic anhydride production and purification process capable of producing an improved phthalic anhydride product having a higher freeze point (131.0° C. and higher) and an improved color stability (Hazen color of 20 units after 1.5 hours at 250° F., see for example, U.S. Patent No. 2,786,805).

Color precursors, often called color-bodies, usually derive from unknown product impurities. On the other hand, product impurities leading to lowered freeze points are usually of known composition but difficult to minimize. While no single new process element of the invention process is essentially responsible for the above marked product quality improvement, a substantial contribution appears to result from the new filtrate recycle system used and the thermal treatment of the first-stage filtrate in the process concentration step, process elements 47–53, reespectively.

The expected saving in crude phthalic acid results from the employment of this system and, unexpectedly, the final product shows a large improvement in the Hazen color test. Instead of the expected 300 color value, the new product color value is about 20. Whereas the former process yielded a product which was merely satisfactory, the new product is excellent, and at the same time the freeze point improvement is as much as 0.4° C. temperature units.

In order to obtain these results, from about 10–30, preferably about 15, volume percent of the first-stage filtrate is processed in concentrator 49, wherein from about 70–90, preferably about 85, percent of the filtrate water is removed by evaporation. The concentrated solution is then cooled in heat exchanger 51 to about 90° F. and the precipitated solids are separated from the filtrate in centrifuge 53, and the filtrate is rejected via line 54. Using process water introduced via line 56, the solid filter cake thus recovered is sluiced out of centrifuge 53 into line 57 and recycled back to recovery vessel 4.

In the operation of the dual temperature converter, two separate molten salt bath systems are required. Molten salt at a temperature in the range 850°–1100° F. is introduced via line 62, circulated through the upper portion of the surrounding shell of the converter and then exited via line 63 and returned to the salt reservoir where the temperature is adjusted. Similarly, via line 60 molten salt at about 625° F. is introduced, circulated, and exited for recycle via line 61. Control of temperature in the reaction zone and cooling rates in the recovery zone are in large part effectuated by varying initial temperatures and flow rates of the molten salt or other suitable heat transfer media.

We claim:

1. A process for the vapor phase partial oxidation of orthoxylene which comprises continuously introducing a vaporized feed of orthoxylene and molecular oxygen into contact with a fixed bed solid vanadium oxide catalyst having therein a reaction zone at a temperature in the range 1000–1500° F. and wherein said catalyst bed is in indirect heat exchange with two successive juxtapositioned heat exchangers, the primary reaction zone exchanger being maintained at a temperature of about 850–1100° F. and the secondary thermal stabilization zone exchanger being maintained at a temperature of about 400–800° F. and withdrawing the resulting reaction product mixture comprising phthalic anhydride from said stabilization zone.

2. The process of claim 1 wherein said reaction zone temperature is in the range 1100°–1400° F.

3. A process for the production of phthalic anhydride which comprises:
   (1) contacting a vaporous mixture comprising orthoxylene and molecular oxygen with an oxidation catalyst under oxidizing conditions in a dual temperature zone converter, said dual zone being maintained by two successive juxtapositioned heat exchangers;
   (2) withdrawing the resulting reaction product mixture from said converter and introducing said mixture into contact with water and producing a slurry comprising phthalic acid and water;
   (3) maintaining the composition of said slurry in a weight range of about one part solid acid to about 3–19 parts water by withdrawing a portion of said slurry from said scrubber vessel and introducing therein make-up water comprising recycled process water and fresh water in an amount substantially equivalent to that withdrawn;
   (4) introducing the withdrawn scrubber vessel slurry into a first-stage centrifuge and recovering a crude phthalic acid filter cake and a first-stage filtrate;
   (5) recycling a portion of said first-stage filtrate to the scrubber vessel and diverting from about 10–30% of said filtrate to a secondary crude phthalic acid recovery process section;
   (6) evaporating a substantial portion of said diverted filtrate and cooling the resulting residual filtrate thereby producing a secondary slurry of crude phthalic acid;
   (7) separating said secondary slurry into liquid and solid components and passing the solid fraction into the scrubber vessel;
   (8) passing said first-stage filter cake in admixture with water into the first of 1–3 crude product reslurry-centrifuge stages, the first being carried out using recycled process water and fresh water, and the succeeding stages employing fresh water;
   (9) transferring the crude phthalic acid filter cake recovered in the last reslurry-centrifugation stage into a dehydration vessel and thermally removing water to yield crude phthalic anhydride; and
   (10) distilling said crude phthalic anhydride to recover purified phthalic anhydride.

References Cited in the file of this patent
UNITED STATES PATENTS

| | | |
|---|---|---|
| 2,117,359 | Porter | May 17, 1938 |
| 2,438,469 | Levine | Mar. 23, 1948 |
| 2,786,805 | Sullivan et al. | Mar. 26, 1957 |